US010552141B1

(12) United States Patent
Marriner

(10) Patent No.: US 10,552,141 B1
(45) Date of Patent: Feb. 4, 2020

(54) UPGRADING AN EXECUTION ENVIRONMENT FOR EVENT-DRIVEN FUNCTIONS

(71) Applicant: Amazon Technologies, Inc., Seattle, WA (US)

(72) Inventor: Dylan Owen Marriner, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/905,675

(22) Filed: Feb. 26, 2018

(51) Int. Cl.
*G06F 9/44* (2018.01)
*G06F 8/65* (2018.01)

(52) U.S. Cl.
CPC .................................. *G06F 8/65* (2013.01)

(58) Field of Classification Search
CPC ..... G06F 8/60; G06F 8/65; G06F 8/68; G06F 11/1433
See application file for complete search history.

(56) References Cited

U.S. PATENT DOCUMENTS

| | | | | |
|---|---|---|---|---|
| 8,863,111 | B2 * | 10/2014 | Selitser | H04L 67/34 717/120 |
| 2004/0168153 | A1 * | 8/2004 | Marvin | G06F 8/71 717/120 |
| 2011/0271270 | A1 | 11/2011 | Bowen | |
| 2014/0013315 | A1 * | 1/2014 | Genevski | G06F 8/60 717/170 |
| 2014/0189677 | A1 | 7/2014 | Curzi et al. | |
| 2015/0007332 | A1 * | 1/2015 | Satish | G06F 8/60 726/25 |
| 2018/0336027 | A1 * | 11/2018 | Narayanan | G06F 8/61 |

* cited by examiner

*Primary Examiner* — Duy Khuong T Nguyen
(74) *Attorney, Agent, or Firm* — Robert C. Kowert; Kowert, Hood, Munyon, Rankin & Goetzel, P.C.

(57) ABSTRACT

An event-driven compute service upgrades an execution environment for registered functions of the compute service. Some compute nodes of the service have an updated version of the execution environment and some compute nodes have the old version of the execution environment. As a part of the upgrade process, some functions are executed in both environments. For example, for some invocations of a particular function, the function is executed in the updated execution environment while for other invocations of the same function, the function is executed in the old execution environment. Based on resulting status of the executions, the compute service determines that the particular function is compatible or incompatible with the updated version of the execution environment. The compute service performs subsequent executions of incompatible functions in the old version of the execution environment instead of in the updated version. A client may be notified of the incompatibility.

20 Claims, 10 Drawing Sheets

UPGRADING AN EXECUTION ENVIRONMENT FOR EVENT-DRIVEN FUNCTIONS

BACKGROUND

Many of today's computer applications are capable of performing certain tasks in response to events (e.g., executing a function when receiving user input or receiving input from another device). Certain types of computer applications can be implemented by remote service providers and can be used by multiple clients from different locations. A remote service provider may offer a compute service that a client may use to configure a particular function to run at the remote service provider whenever a particular event occurs. For example, a particular function may execute whenever the compute service receives information from a web page that was entered by a user. As another example, a different function may execute whenever a new row of data is added to a database table that is maintained by the service provider.

A service provider may frequently make changes to the execution environment that runs functions for the compute service offered by the service provider. For example, an updated version of an execution environment may be created due to a kernel change or due to changes in the hardware that implements the execution environment. Due to the large number of different functions that are executed by the compute service, it can be difficult or impractical to verify that every function is compatible with the updated version of the execution environment before releasing it into production. Therefore, when an updated version of an execution environment is rolled out by a service provider, many clients may experience function errors, reduced function performance, and other function compatibility issues due to upgrading of the execution environment.

Figure 1:
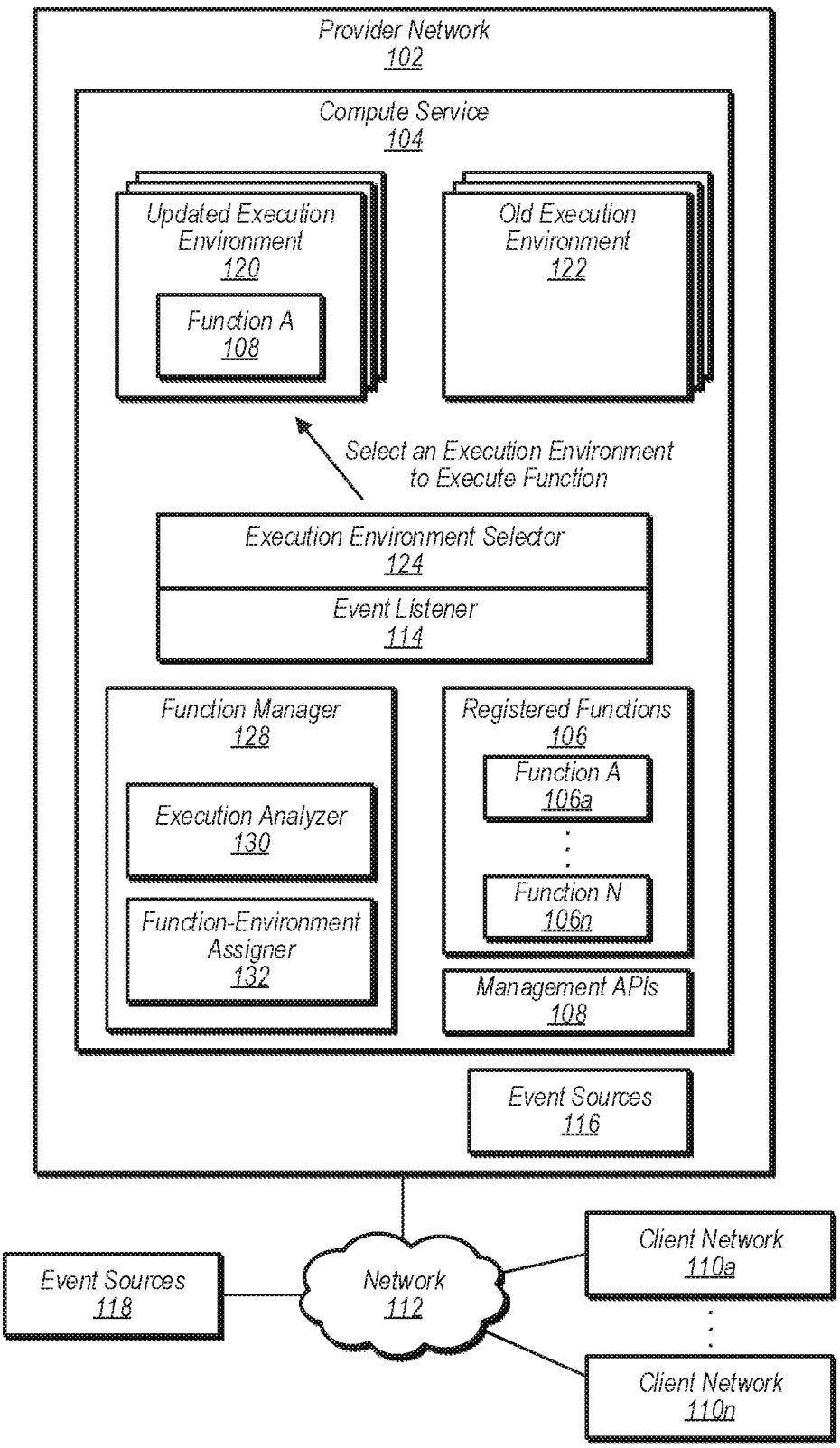
FIG. 1 illustrates a system for upgrading an execution environment for event-driven functions, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement upgrading an execution environment for event-driven functions. In embodiments, an event-driven compute service of a provider network may invoke functions to perform one or more tasks. Any type of suitable trigger or input may cause the compute service to invoke a function. For example, the compute service may detect an event and determine that the detected event matches a defined event (e.g., a submission of data from a particular web page, a query for a particular database table, receiving a function call, etc.) that invokes a particular function to perform a task.

When a function is invoked, the event-driven compute service may execute the function in a previous version ("old" version) of an execution environment. In some cases, when the function is invoked, the event-driven compute service may instead execute the function in an updated version of the execution environment. Therefore, according to some embodiments, when a compute service is upgrading an execution environment from a previous version to an updated version, a client may incrementally migrate (e.g., on a per-invoke basis) to the updated version of the execution environment by using the updated version of the execution environment for only a portion of function executions (at least initially). In embodiments, an updated execution environment may refer to or include the same meaning as an updated version of an execution environment. Similarly, an old execution environment may refer to or include the same meaning as an old (or previous) version of an execution environment.

In embodiments, the event-driven compute service may obtain a resulting status of one or more executions of a function in the updated execution environment. Based on the resulting status, the provider network and/or client may proceed with the migration to the updated execution environment or may roll back the migration to a previous version. For example, if the resulting status indicates that the function is compatible with the updated execution environment, then some, all, or a higher percentage of subsequent (e.g., future) executions of the function may occur in the updated execution environment. However, if the resulting status indicates that the function is not compatible with the updated execution environment, then the event-driven compute service may reduce or stop subsequent executions of the function in the updated execution environment.

Embodiments allow a provider network to upgrade to an updated execution environment for event-driven functions while minimizing and reducing a negative performance impact for clients of the compute service due to incompatibility issues between certain functions and the updated execution environment. For example, as described herein, only a portion of function executions may initially occur in the updated version of the execution environment while remaining function executions occur in the old version of the execution environment.

As discussed herein, when rolling out an updated execution environment, the provider network may incrementally migrate invocations for each client function to the updated execution environment. If any incompatibility issues are detected for a particular function (e.g., increase in the number of function errors, increase in execution latency, etc.), than the provider network may roll back the migration so that the function is only executed in the old execution environment (e.g., for at least a threshold period of time, such as 24 hours or 1 week). In embodiments, when the incompatibility issues are detected, the function may be flagged for further corrective actions and/or the client may be informed of the incompatibility issues.

By providing the ability to select the version of the execution environment at a per-request (e.g., per-function invoke) granularity, the provider network and/or the client has more control over the migration process than traditional methods for upgrading execution environments. Moreover, a provider network may transparently and continuously upgrade the execution environment in which client code is running (e.g., patching vulnerabilities of the execution environment, providing new features and/or better performance) while minimizing and/or reducing the risk that the upgrade changes will negatively impacting performance of client applications that use the functions.

In embodiments, a particular client may be given a time window to address the incompatibility issues for one or more functions, while other clients without issues may immediately be upgraded to use the updated execution environment for their functions. In some embodiments, only some functions of a client may be temporarily limited to execution in the old environment due to incompatibility, while remaining functions of the client are upgraded for use in the updated execution environment. This allows control over the upgrade process at a per-function granularity as well as a per-client granularity. Thus, various embodiments provide ways for clients to continue using functions during an execution environment upgrade, regardless of whether the functions are compatible with the upgraded execution environment. This allows clients to avoid and/or reduce service outages and to increase function/application performance during the upgrade process.

FIG. 1 illustrates a system for upgrading an execution environment for event-driven functions, according to some embodiments. In embodiments, the provider network 102 and/or the compute service 104 depicted in FIG. 1 may be the same type of provider network and/or compute service, and include some or all of the components as other provider networks and/or compute services depicted in FIGS. 1-7.

In the depicted embodiment, the provider network 102 includes a compute service 104 for one or more clients. In various embodiments, the compute service may be considered an "event-driven" compute service, since the compute service may invoke and/or execute functions in response to detecting associated events, as discussed herein. Thus, in embodiments, functions that are executed by the compute service 104 may be considered event-driven functions. In embodiments, an event-driven compute service may invoke and/or execute functions in response to any type of suitable trigger or input (e.g., receiving a function call, receiving certain input, triggering at a particular time or at periodic intervals, etc.).

In embodiments, a user and/or the compute service may register one or more functions 106 in the compute service 104 using management application programming interfaces (APIs) 108. For example, a user at a remote client network 110 may provide input (e.g., via a user interface, command line, or API) to a computing device of the client network 110, which sends one or more commands to the management APIs 108 to register a function. As discussed herein, as part of registering a function, a user may provide some or all of the function code or may select and/or modify a function that exists at the compute service 104. In some embodiments, the compute service 104 may store or maintain a list or other data indicating the registered functions 106 of one or more clients of the compute service 104. In the depicted embodiment, devices of the client networks 108 communicate with the provider network 102 via a network 112 (e.g., wide-area network, the Internet, etc.).

In some embodiments, a given client may register a function 106 using a client device or another service that is within the provider network 102 (e.g., via a user interface and/or an API). For example, a client may register a function using a software application running on a compute instance and/or computing device within the provider network 102. As used herein, any actions performed by a client or other user may be performed via an external client device or by a client device or service as described above, or via any other suitable technique.

In embodiments, to register a function 106, the compute service 104 and/or a user defines one or more events that will trigger and/or invoke the function. In embodiments, an event may be any input, activity, or other event that is detectable by the compute service 104 and that may be used to invoke a function (e.g., cause the function to launch and/or execute in an execution environment). In embodiments, a user may provide input to define the event via the management APIs 108. In the depicted embodiment, an event listener 114 of the compute service 104 may receive and/or detect one or more of the events described herein. For example, the event listener 114 may determine whether a received and/or a detected event matches a defined event that has been associated with a registered function and if so, causes the function to be invoked.

In embodiments, a given event may originate at and/or may be received from an event source within the provider network 102 (e.g., an event source 116) or an event source external to the provider network 102 (e.g., an event source 118 of a remote device/network or a device of a client network 110). In embodiments, an event source within the provider network 102 or external to the provider network may be any computing device, software application, or other suitable event source. In some embodiments, the event sources external to the provider network 102 may communicate with the provider network 102 via the network 112.

In response to a determination by the event listener 114 that an event matches a defined event associated with a function, the compute service 104 may invoke the function in an execution environment and the function executes in the execution environment. As discussed above, for various reasons the compute service 104 may migrate from using an old version of an execution environment to using an updated version of an execution environment.

In the depicted embodiment, multiple instances of a particular updated execution environment 120 (e.g., upgraded and/or new version of the execution environment) may be available to execute functions and multiple instances of an old execution environment 122 (e.g., previous version) may also be available to execute functions. In some embodiments, each instance of an execution environment runs on a different compute host (e.g., a server or other computing device). In some embodiments, two or more execution environments may run on the same compute host, as separate instances of execution environments.

In embodiments, the ability of the compute service 104 to execute a given function in either the updated execution environment 120 or the old execution environment 122 allows a provider network to upgrade to an updated execution environment 120 for event-driven functions while minimizing and reducing a negative performance impact on clients due to incompatibility issues between certain functions and the updated execution environment 120. For example, only a portion executions for a particular function may initially occur in the updated execution environment 120 while remaining function executions occur in the old execution environment 122.

As discussed above, multiple functions 106a-106n may be registered with the compute service to be executed in one of the execution environments when invoked. For some or all of the registered functions, the function may be run in a different version of the execution environment for different invocations. As part of the upgrade and migration process, function may be invoked in different execution environments at different times. For example, when a given function is invoked, the execution environment selector 124 may select the updated execution environment 120 to execute the function or may instead select the old execution environment 122 to execute the function.

In the depicted embodiment, the compute service selects (e.g., via the execution environment selector 124) the updated execution environment 120 to execute function A 126 for a particular invocation of function A 126. When function A 126 is invoked again (e.g. at a later time), the compute service may instead select the old execution environment 120 to execute function A 126. Function A 126 may be invoked any number of times in each execution environment.

Therefore, for at least some invocations of a given function, the compute service may execute the function in the updated version of the execution environment and for other invocations of the given function, the compute service may execute the function in the previous version of the execution environment. In embodiments, the compute service may obtain a resulting status that includes a resulting status for each of the executions of the function in the updated version and the old version of the execution environment. The resulting status may include data indicating results of execution of the function (e.g., whether there were errors, the type of errors, one or more performance metrics for execution such as length of time for execution, latency, etc.). In some embodiments, the resulting status may be sent from the execution environment and/or the compute host running the execution environment to a function manager 128.

In embodiments, the function manger 128 includes an execution analyzer 130 that analyzes the resulting status that was received. The execution analyzer 130 may receive a resulting status for any number of different registered functions 106 of the compute service. In some embodiments, the execution analyzer 130 may determine, based on the resulting status of the executions of the registered functions, that some of the registered functions are compatible with the updated version of the execution environment and others of the registered functions are incompatible with the updated version of the execution environment.

In embodiments, the function-environment assigner 132 may modify the compute service to perform subsequent executions of the incompatible functions in the previous version of the execution environment instead of in the updated version of the execution environment (e.g., for at least a threshold period of time) and/or the function-environment assigner 132 may modify the compute service to perform subsequent executions of the compatible functions in the updated version of the execution environment instead of in the previous version of the execution environment. For example, if the execution analyzer determines that function A 126 is compatible with the updated execution environment, then the function-environment assigner 132 may modify the compute service to perform subsequent executions of function A 126 in the updated version of the execution environment instead of in the previous version of the execution environment.

However, if the execution analyzer determines that function A 126 is incompatible with the updated execution environment, then the function-environment assigner 132 may modify the compute service to perform subsequent executions of function A 126 in the previous version of the execution environment instead of in the updated version of the execution environment. In embodiments, after a threshold period of time (e.g., 1 hour, 1 day, etc.), the compute service may begin to perform some or all subsequent executions in the updated version of the execution environment.

In embodiments, the execution analyzer 130 may determine that a given function is compatible with the updated version of the execution environment if the function satisfies one or more criteria for execution in the updated version of the execution environment (e.g., for one or multiple executions of the function corresponding to one or more different invocations). Conversely, the execution analyzer 130 may determine that a given function is incompatible with the updated version of the execution environment if the function does not satisfy the one or more criteria for execution in the updated version of the execution environment (e.g., for one or multiple executions of the function corresponding to one or more different invocations).

In various embodiments, for a given function, the one or more criteria for execution in the updated version of the execution environment may include one or more of: execution without an error, execution with less than a threshold number of errors, execution within a threshold period of time, and meeting one or more performance metrics for execution of the function. For example, if a particular execution of a given function causes two or more errors, then the execution analyzer 130 may determine that the function is incompatible.

In embodiments, any of the criteria may apply to a threshold number of executions of the function (e.g., corresponding to different invocations). For example, if the particular execution of the given function causes two or more errors for 10 or more different executions of the function, then the execution analyzer 130 may determine that the function is incompatible. In embodiments, the criteria may be applied to average execution results (e.g., average for all invocations of the function). For example, if the average number of errors for 10 different executions of a function is less than two errors, then the execution analyzer 130 may determine that the function is compatible (or if the average is two or more errors, then the function may be incompatible).

In various embodiments, an execution environment may include a java virtual machine capable of executing a registered function. In embodiments, an execution environment may be any other type of execution environment capable of executing a registered function. In embodiments, launching or instantiating an execution environment may include sending the execution environment (e.g., code and/or components of the execution environment) to a host that will execute, build, and/or install the execution environment on the host. In embodiments, launching or invoking a function may include sending the function (e.g., function code) to a host that will execute the function.

In embodiments, the execution environment may terminate the function upon completion of one or more tasks responsive to the event. In embodiments, this may reduce computing resource usage, because functions and associated resources to run the functions will only be used when responding to events. In some embodiments, to free up resources, the event-driven compute service does not guarantee that any execution state of the registered function is saved when the registered function is terminated. In embodiments, any number of different execution environments may be used to execute any number of different registered functions. Thus, in embodiments, the specific language used for a function may not be a limiting factor for a client.

In embodiments, the registered functions may store or include a unique identifier within the event-driven compute service 104 for each corresponding registered function. Additional data may also be stored for each corresponding registered function, such as defined events that trigger a registered function. In embodiments, the registered functions may include a table, list, or any other data structure suitable for storing data associated with the registered functions.

In some embodiments, in response to a determination that an event matches a defined event to trigger the registered function, the registered function launches in an execution environment. In embodiments, an event may match a defined event if one or more portions of the event (or one or more portions of data associated with the event) map to one or more portions of the defined event (or one or more portions of data of the defined event). An event may include receiving data, sending data, and/or any other occurrence that may be detected by the event-driven compute service and/or the provider network and suitable for comparison to a defined event to determine if there is a matching or mapping. In some embodiments, as part of registering the function, one or more defined events may be assigned to the function that trigger the function and cause the function to launch. In embodiments, "launching" a function is executing a function (or code of the function), so that the function is an actively running function.

In some embodiments, a client of the event-driven compute service, a client device, or a source of the event (e.g., an application or other source) is unaware of aspects of the event-driven compute service and/or how the event-driven compute service is implemented. For example, to implement the registered function, the event-driven compute service may execute code on one or more computing devices of the provider network, wherein the client, client device, or event source is unaware of the identity and/or network address of the one or more computing devices. Thus, in embodiments, the registered function and/or other code may be executed in response to events, without a client having to manage, own, or run a fleet of dedicated servers to execute code on.

Thus, in various aspects, use of the event-driven compute service enables a "server-less" service. Without the use of the event-driven compute service, a client that needs to establish and use functions as described herein may need to manage its own fleet of servers to listen to events, as well as manage identities and security credentials for the fleet of servers in order to accept and/or authenticate client devices to establish connections. However, as described herein, a client may use an event-driven compute service to listen for and respond to a large number of events without the requirement for additional server infrastructure that needs to be managed by the client.

Figure 2A:
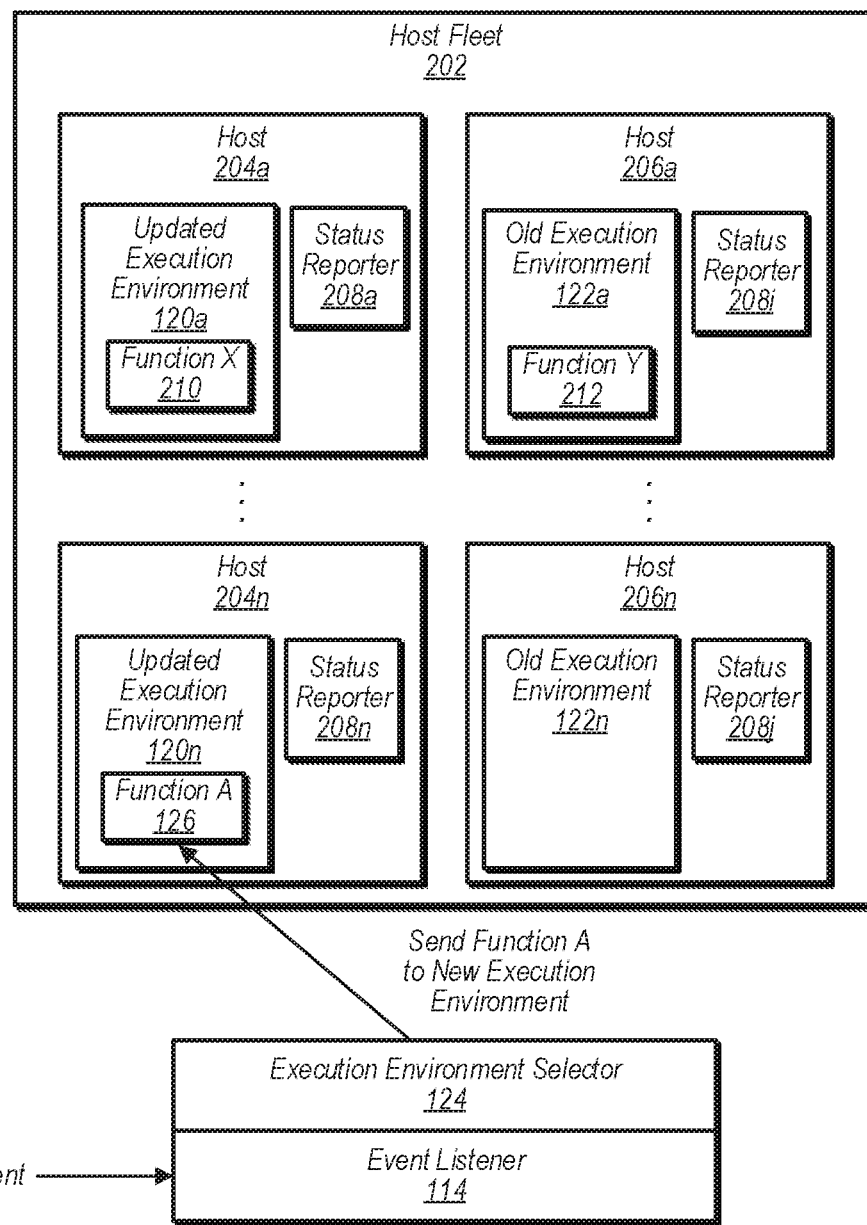
FIG. 2A is a block diagram illustrating an example host fleet for an event-driven compute service, including a host that executes a function in an updated execution environment in response to an event, according to some embodiments.

FIG. 2A is a block diagram illustrating an example host fleet for an event-driven compute service, including a host that executes a function in an updated execution environment in response to an event, according to some embodiments. In the depicted example, a host fleet 202 includes hosts 204a-204n that each host an updated version of an execution environment 120 and hosts 206a-206n that each host an old version of the execution environment 122.

In the depicted embodiment, each host includes a status reporter 208 that collects the resulting status of execution of a function and sends the resulting status to the execution analyzer 130. For example, the status reporter 208n collects the resulting status of execution of function A and sends the resulting status to the execution analyzer 130.

As shown, an event causes the event listener 114 to invoke function A and the execution environment selector sends function A to the updated execution environment 120n of the host 204n for execution. In embodiments, the execution environment selector may select the host 204n from among the hosts 204 randomly or based on performance metrics of one or more of the hosts 204. For example, the execution environment selector may select the host 204n because the host 204n has the lightest workload or is one of the hosts with the lightest workload.

In the depicted embodiment, function X is running in the updated execution environment 120a and function Y is running in the old execution environment 122a. Thus, the compute service may execute any number of different functions concurrently, using different hosts. Moreover, the different functions may be provided by any number of different clients.

As discussed above, the upgrade process for functions may include executing the functions in different execution environments for different invocations. For example, as shown in FIG. 2B, for some invocations, function A may be executed in the old execution environment.

Figure 2B:
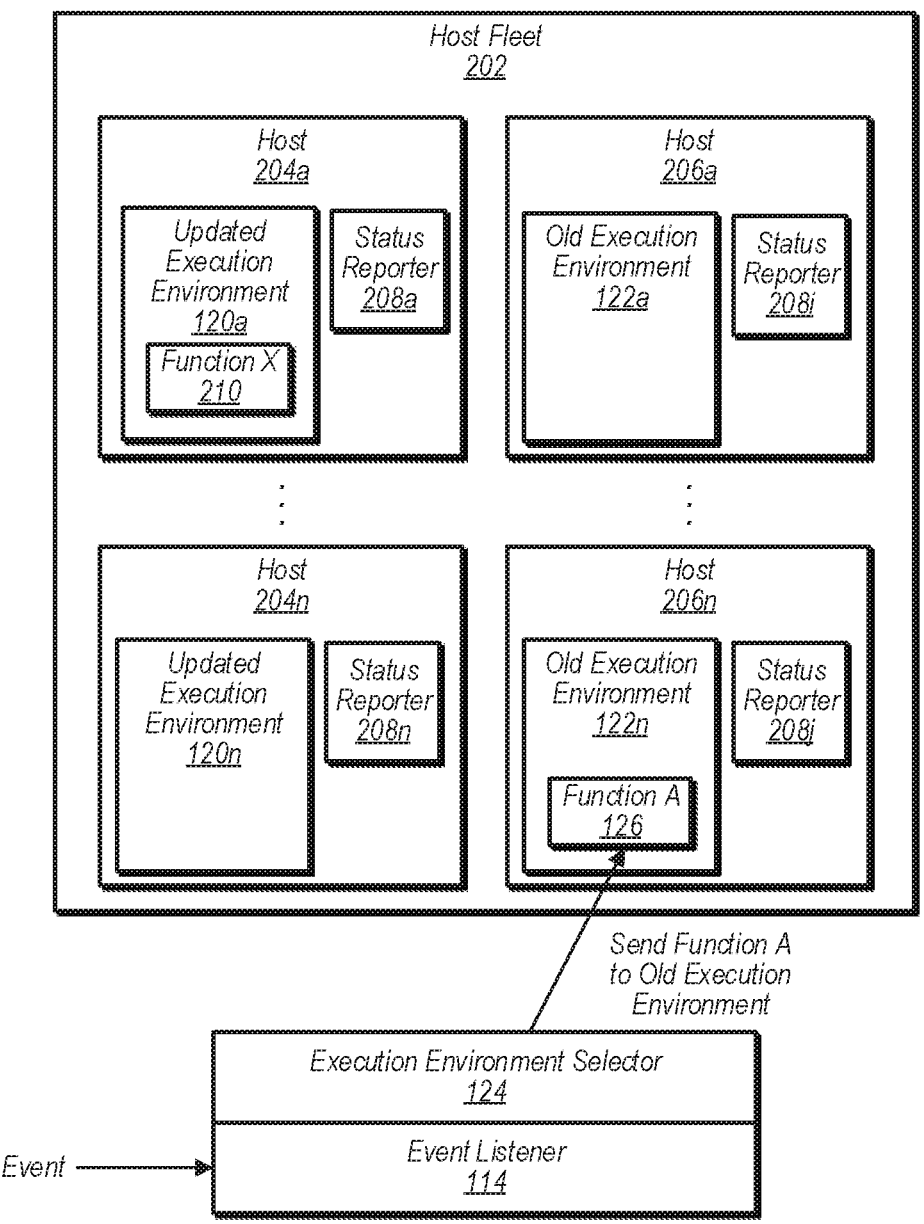
FIG. 2B is a block diagram illustrating an example host fleet for an event-driven compute service, including a host that executes a function in an old execution environment in response to an event, according to some embodiments.

FIG. 2B is a block diagram illustrating an example host fleet for an event-driven compute service, including a host that executes a function in an old execution environment in response to an event, according to some embodiments. In the depicted example, a different invocation of function A results in function A being executed in the old version of the execution environment.

In embodiments, the execution environment selector 124 may select a portion, a certain number, or a certain percentage of executions for a function to occur in the old execution environment and another portion, number, or percentage of executions for a function to occur in the old execution environment. In some embodiments, the updated and old environments may be chosen at random (e.g., using a random-based algorithm). In the depicted embodiment, function X is still running in the updated execution environment 120a, but function Y is no longer running in the old execution environment 122a. Thus, the host 206a may be available to execute another function.

Figure 3A:
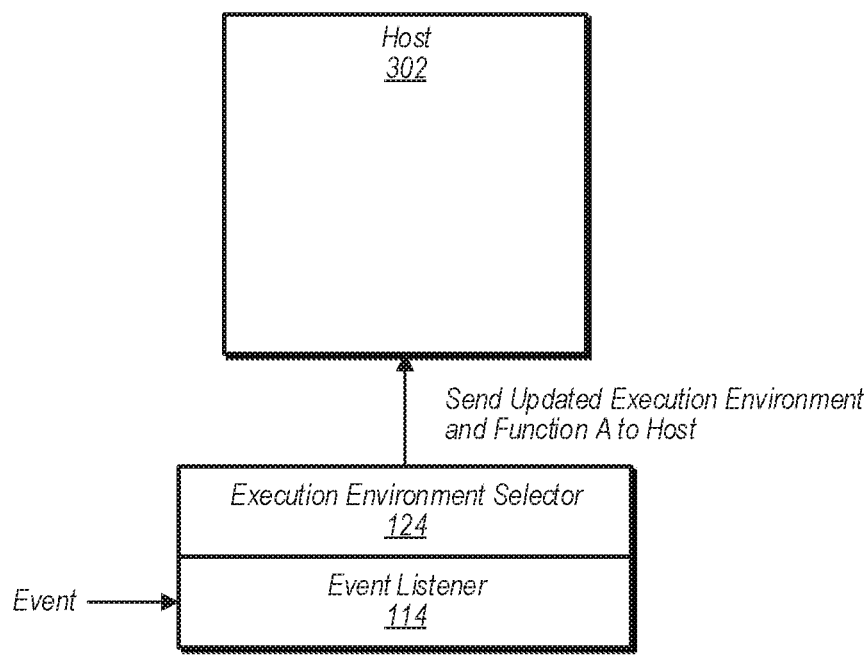
FIG. 3A is a block diagram illustrating sending an updated execution environment and a function to a host for an event-driven compute service in response to an event, according to some embodiments.

FIG. 3A is a block diagram illustrating sending an updated execution environment and a function to a host for an event-driven compute service in response to an event, according to some embodiments.

In the example embodiment, an event causes the compute service to send an updated version of the execution environment and function A to an additional host. This may allow the compute service to scale to provide more computing power to handle more function invocations. For example, this may occur when the compute service determines that function A is compatible with the updated version of the execution environment, and therefore will need to perform a larger number of executions using the updated execution environment.

In embodiments, an execution environment (updated, old, or any other version) may include software components and/or hardware components (e.g., components of the host 302 computing device) that are used to implement (e.g., run or execute) functions. Therefore, an updated execution environment may include one or more changes to the software components and/or one or more changes to the hardware components that make the updated execution environment different than the old or previous version of the execution environment. In embodiments, the changes to the software components may include adding one or more new software components, removal of one or more software components, and/or modification of one or more software components. Similarly, changes to the hardware components may include adding one or more new hardware components, removal of one or more hardware components, and/or modification of one or more hardware components.

Figure 3B:
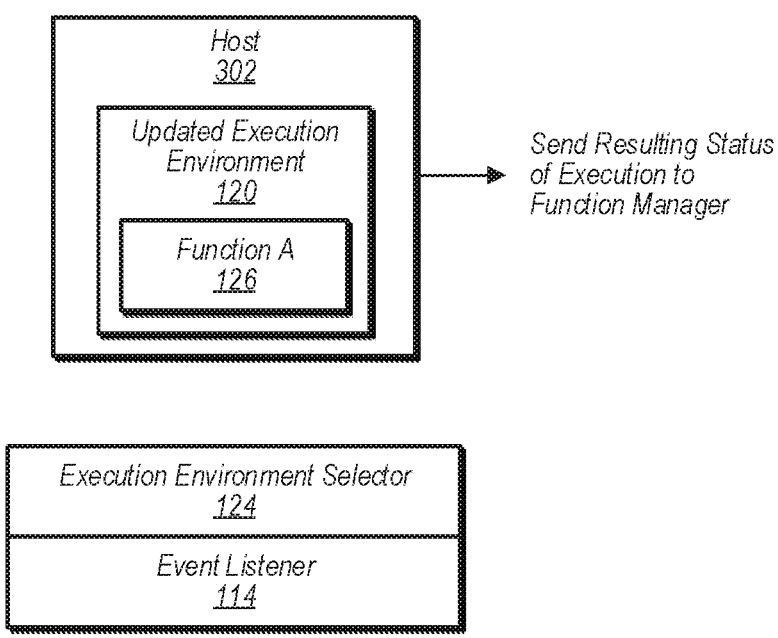
FIG. 3B is a block diagram illustrating instantiating an updated execution environment in a host for an event-driven compute service and executing a function in response to an event, according to some embodiments.

FIG. 3B is a block diagram illustrating instantiating an updated execution environment in a host for an event-driven compute service and executing a function in response to an event, according to some embodiments.

As shown, the host 302 instantiates the updated execution environment 120 and executes function A in the updated version of the execution environment. The host (e.g., via the status reporter) may then send the resulting status of the execution of function A to the execution analyzer, as discussed above.

Figure 3C:
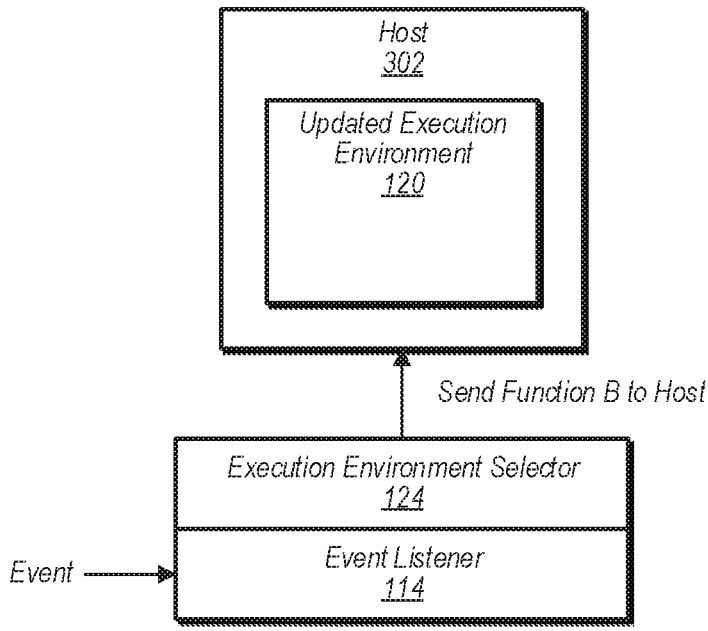
FIG. 3C is a block diagram illustrating sending a function to an updated execution environment of a host for an event-driven compute service in response to an event, according to some embodiments.

FIG. 3C is a block diagram illustrating sending a function to an updated execution environment of a host for an event-driven compute service in response to an event, according to some embodiment.

In the depicted embodiment, function A is no longer running on the host 302. Thus, the host 302 is available to execute another function. As shown, the execution environment selector sends function B 304 to the host in response to detection of an event by the event listener. In embodiments, function B may be provided by the same client that provided function A or function B may be provided by a different client.

Figure 3D:
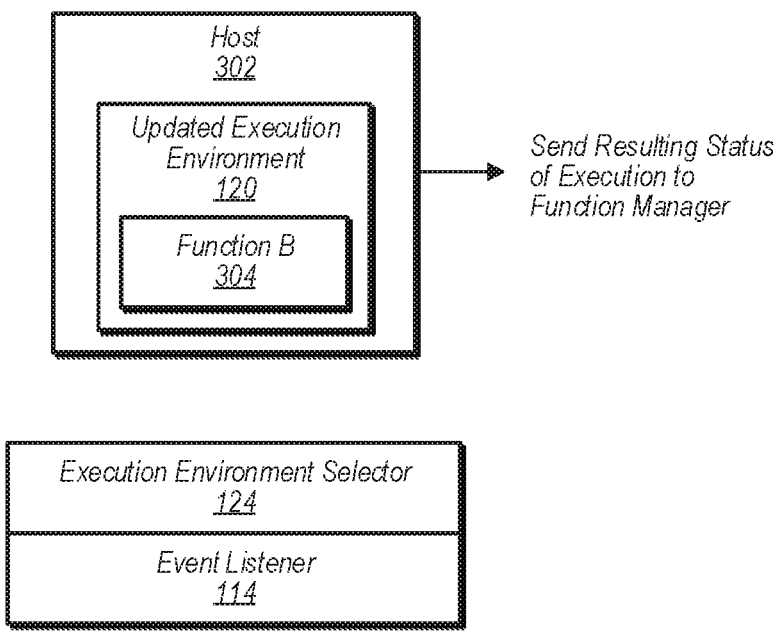
FIG. 3D is a block diagram illustrating executing a function in an updated execution environment of a host for an event-driven compute service in response to an event, according to some embodiments.

FIG. 3D is a block diagram illustrating executing a function in an updated execution environment of a host for an event-driven compute service in response to an event, according to some embodiments.

As shown, the host 302 executes function B in the updated version of the execution environment. The host (e.g., via the status reporter) may then send the resulting status of the execution of function B to the execution analyzer, as discussed above.

Figure 4:
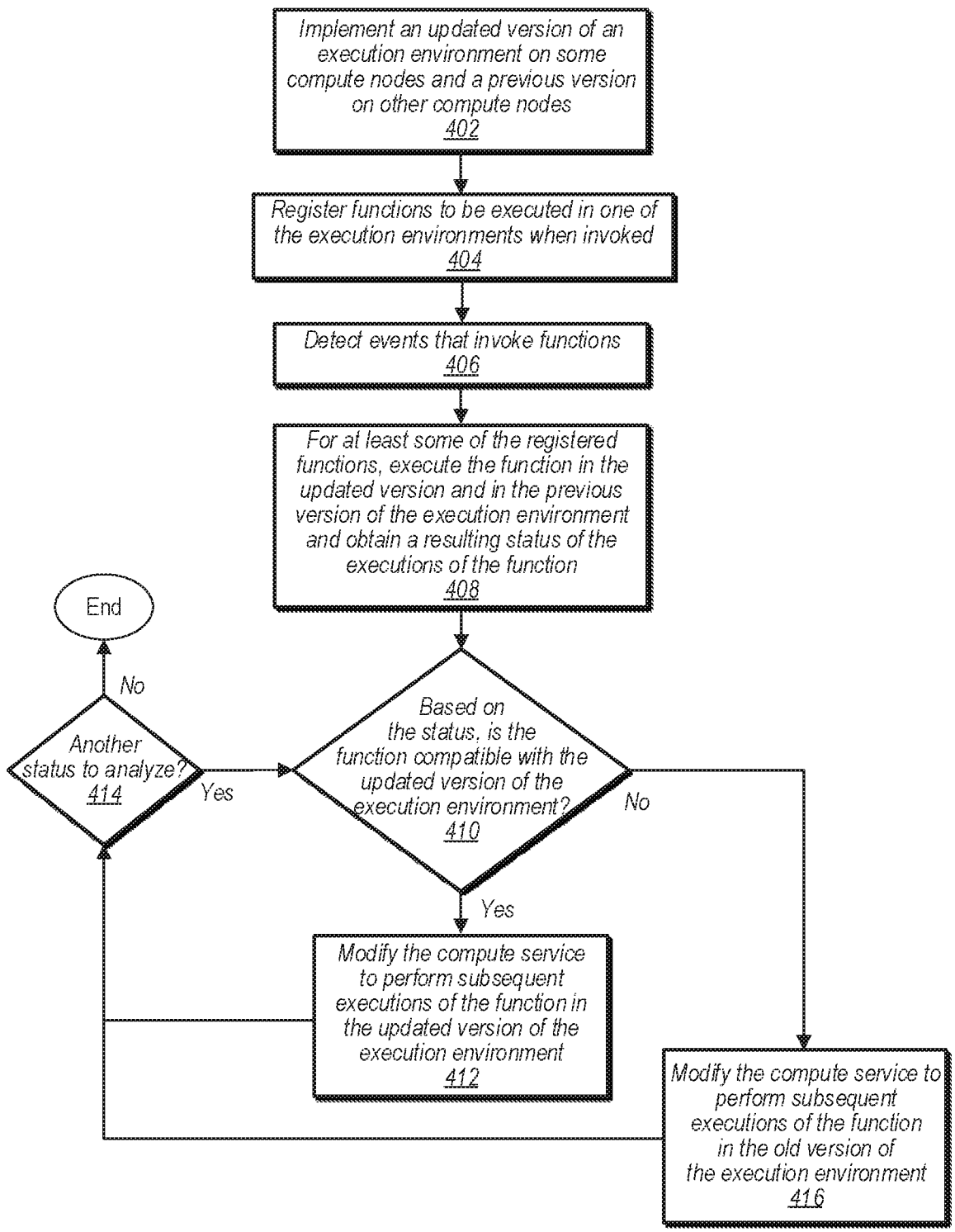
FIG. 4 is a flow diagram of a process for upgrading an execution environment for event-driven functions, according to some embodiments.

FIG. 4 is a flow diagram of a process for upgrading an execution environment for event-driven functions, according to some embodiments. One or more portions of the illustrated processes of FIGS. 4-7 may be performed via one or more components of an event-driven compute service 104 and/or other components of a provider network, such as provider network 102.

At block 402, a compute service implements an updated version of an execution environment on some compute nodes and a previous version on other compute nodes. At block 404, the compute service registers functions to be executed in one of the execution environments when invoked.

At block 406, the compute service detects events that invoke functions. At block 408, for at least some of the registered functions, the compute service executes the function in the updated version and in the previous version of the execution environment and obtains a resulting status of the executions of the function. At block 410, the compute service determines, based on the resulting status, whether the function is compatible with the updated version of the execution environment. If so, then at block 412 the compute service (e.g., function-environment assigner) modifies the compute service to perform subsequent executions of the function in the updated version of the execution environment. At block 414, the compute service determines if there is another resulting status to analyze for a function.

At block 410, if the compute service determines that the function is not compatible with the updated version of the execution environment, then at block 416 the compute service modifies the compute service to perform subsequent executions of the function in the old version of the execution environment. At block 414, the compute service determines if there is another resulting status to analyze for a function. If so, the process returns to block 410. If not, the process ends.

In some embodiments, the above process may be repeated for multiple intermediate versions of the execution environment (e.g., one or more different versions of the execution environment that are between the previous version and the updated version). For example, an intermediate version may include one or more of the software and/or hardware versions of the updated execution environment, but not all of the changes.

By executing a function in the intermediate version and the updated version, one or more changes in the execution environment may be identified that caused the function to break (e.g., to be incompatible or to fail to satisfy one or more criteria for execution). For example, if the updated execution environment includes a new software component or a new hardware component that is not present in the intermediate version, and if a function is compatible with the intermediate version but incompatible with the updated version, then the compute service may determine that the new software component or the new hardware component caused the function to break.

The compute service may then indicate to a client the new software component or the new hardware component caused the function to break. The client may then make changes to the function code of the function that cause the function to be compatible with the new software component or the new hardware component. The new function may then be sent from the client to the compute service for testing (e.g., using the intermediate versions and/or the updated version of the execution environment).

Any number of intermediate versions of an execution environment may be used as described above to pinpoint a change in a software and/or hardware component that causes a function to become incompatible. For example, a new incremental intermediate version of an execution environment may be generated for each change in the execution environment between the previous version and the updated version (e.g., modification, addition, or removal of a software or hardware component). Each incremental intermediate version may be tested on one or more functions to pinpoint any particular hardware or software incompatibility issues (if any). For example, a first incremental intermediate version may include an updated hardware or software component. A second incremental intermediate version may include the updated hardware or software component, as well as another updated hardware or software component. A third incremental intermediate version may include addition of a new hardware or software component. A fourth incremental intermediate version may include removal of a hardware or software component, and so on.

Figure 5:
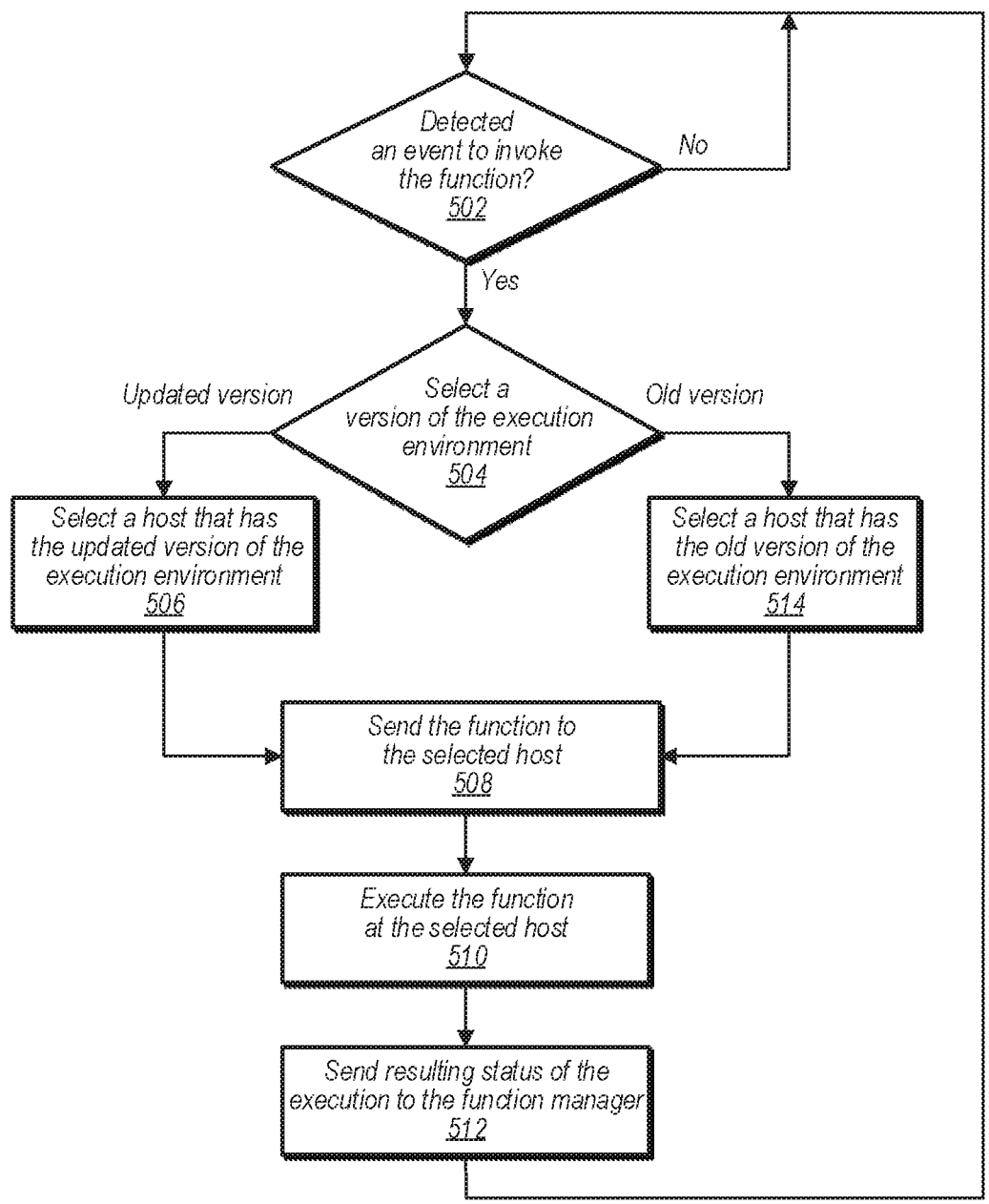
FIG. 5 is a flow diagram of a process for selecting a host with an updated or old version of an execution environment and executing a function in the selected host, according to some embodiments.

FIG. 5 is a flow diagram of a process for selecting a host with an updated or old version of an execution environment and executing a function in the selected host, according to some embodiments.

At block 502, the compute service determines whether an event is detected that invokes a function. If so, then at block 504, the compute service selects a version of the execution environment to execute the function in. As discussed above, the selection may be made according to any suitable algorithm, including random selection.

At block 504, if the updated version of the execution environment is selected, then at block 506, the compute service selects a host that has the updated version of the execution environment. At block 508, the compute service sends the function to the selected host.

Returning to block 504, if the old version of the execution environment is selected, then at block 510, the compute service selects a host that has the old version of the execution environment. The process then proceeds to block 508, where the compute service sends the function to the selected host.

At block 512, the compute service executes the function at the selected host. At block 514, the host sends the resulting status of the execution to the function manager (e.g., the execution analyzer). For example, the status reporter may collect the resulting status and send it to the function manager.

Figure 6:
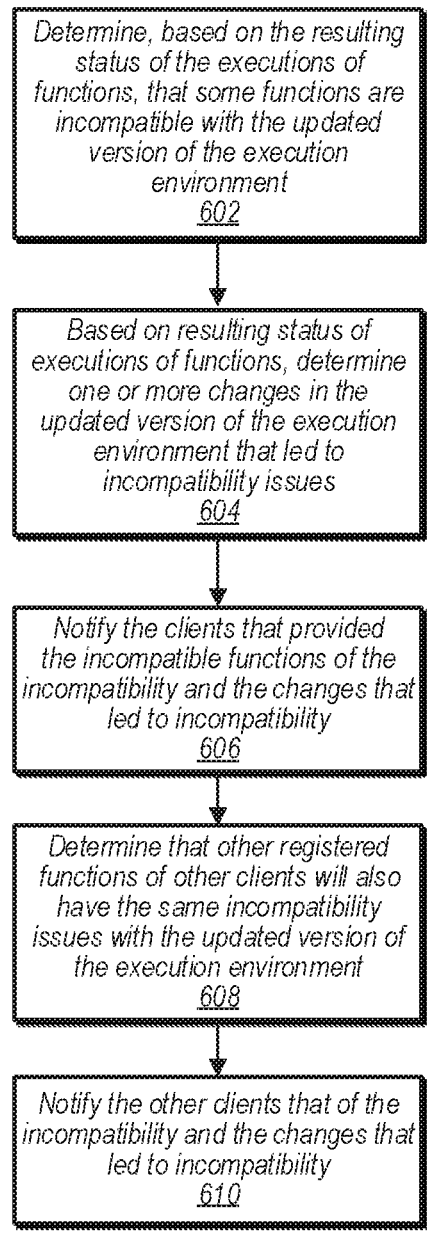
FIG. 6 is a flow diagram of a process for determining that functions are incompatible with an updated version of an execution environment and notifying clients of the incompatibility, according to some embodiments.

FIG. 6 is a flow diagram of a process for determining that functions are incompatible with an updated version of an execution environment and notifying clients of the incompatibility, according to some embodiments.

At block 602, the compute service determines, based on the resulting status of the executions of functions, that some functions are incompatible with the updated version of the execution environment. At block 604, based on resulting status of executions of functions, determine one or more changes (e.g., changes in code/software components and/or hardware components) in the updated version of the execution environment that led to the incompatibility of the functions.

In some embodiments, the compute service and/or an administrator/user of the provider network may determine that one or more changes in the updated execution environment that led to incompatibility with functions need to be rolled back or altered. Thus, the updated execution environment itself may have problems or errors that need to be corrected.

For example, one or more changes in the software components and/or hardware components may need to be rolled back to the previous version or may need to be further modified, replaced, or removed. In some cases, one or more components that were added or removed in the updated environment may need to be removed or added to correct the problem. In some cases, undocumented features or deprecated features of the previous execution environment may no longer be available in the updated execution environment. In some cases, a security patch that was made for the updated environment may need to be changed or replaced with a different version. In embodiments, the provider network corrects the one or more problems or errors and then runs the functions in the updated environment again to determine whether each of them are compatible.

In embodiments, one or more clients may be offered the ability to test their functions for a certain period of time in the updated execution environment or intermediate versions of the execution environment before the compute service upgrades the execution environment so that all of the client functions run on the updated environment. For example, a client may access a test bed that includes one or more hosts that are running respective updated or intermediate versions of the execution environment. As described herein, based on execution results that indicate function incompatibility with the updated environment, the client may make modifications to the function code so that the function is compatible with the updated environment.

At block 606, the compute service notifies the clients that provided the incompatible functions of the incompatibility and the changes that led to incompatibility. At block 608, the compute service determines that other registered functions of other clients will also have the same incompatibility issues with the updated version of the execution environment.

At block 610, the compute service notifies the other clients that of the incompatibility and the changes that led to incompatibility. Thus, the compute service may proactively inform particular clients that particular functions are not compatible with the updated execution environment (e.g., based on the resulting status of executions of functions of different clients), even though the particular functions have not yet executed in the updated execution environment.

In some embodiments, a client may provide to the compute service an updated version of one of the functions that were determined to be incompatible. For example, a client may update a function by modifying at least some of the function code to address the changes and/or new features of the updated execution environment that led to the incompatibility.

The compute service may receive the updated version of the incompatible function. The compute service may then modify itself to enable execution of the updated version of the incompatible function in the updated version of the execution environment (at least for a number of executions or for a threshold amount of time). In embodiments, the compute service may replace or modify the code of the incompatible function with the code of the received updated version of the incompatible function.

In embodiments, the compute service may then obtain additional resulting status of one or more respective executions of the updated version of the function in the updated version of the execution environment. The compute service may then determine, based on the additional resulting status, that the particular function is compatible (or incompatible) with the updated version of the execution environment. The compute service may then modify itself to execute the function in the updated or old version of the execution environment as appropriate, as discussed above.

Figure 7:
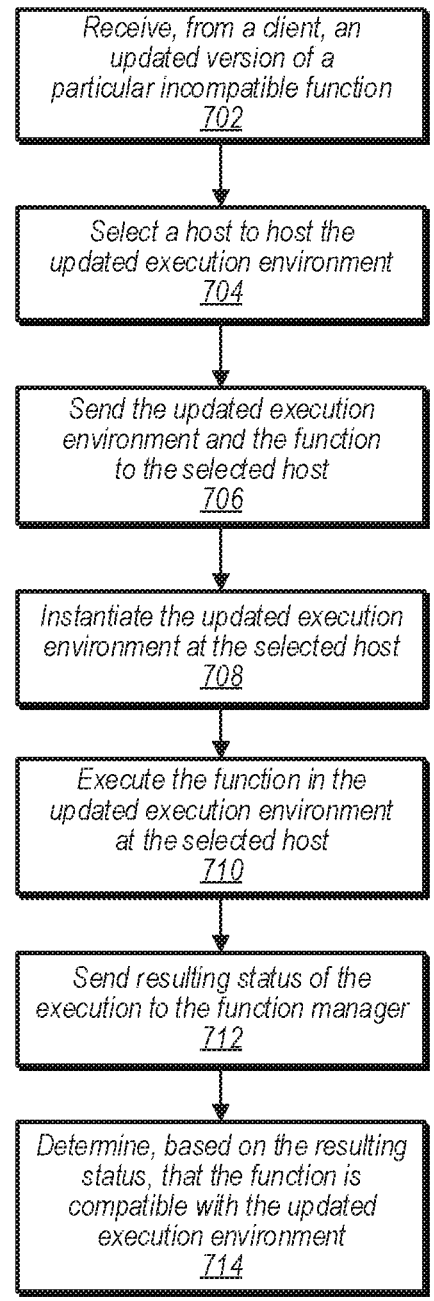
FIG. 7 is a flow diagram of a process for instantiating an updated version of an execution environment at a host and executing a function at the host, according to some embodiments.

FIG. 7 is a flow diagram of a process for instantiating an updated version of an execution environment at a host and executing a function at the host, according to some embodiments.

At block 702, the compute service receives, from a client, an updated version of a particular incompatible function. At block 704, the compute service selects a compute host to host the updated execution environment. At block 706, the compute service sends the updated execution environment and the function to the selected host.

At block 708, the compute service instantiates the updated execution environment at the selected host. At block 710, the compute service executes the function in the updated execution environment at the selected host. At block 712, the compute service sends the resulting status of the execution to the function manger.

At block 714, the compute service determines, based on the resulting status, that the function is compatible with the updated execution environment. As discussed above, in embodiments, the compute service may determine that the function is compatible based on multiple executions of the function in the updated execution environment. Thus, in some embodiments, the compute service may first determine that the function is compatible with the updated execution environment (or satisfies one or more criteria for execution) for at least a threshold number of executions (e.g., 10 or more times) before determining that the function is compatible with the updated execution environment.

Figure 8:
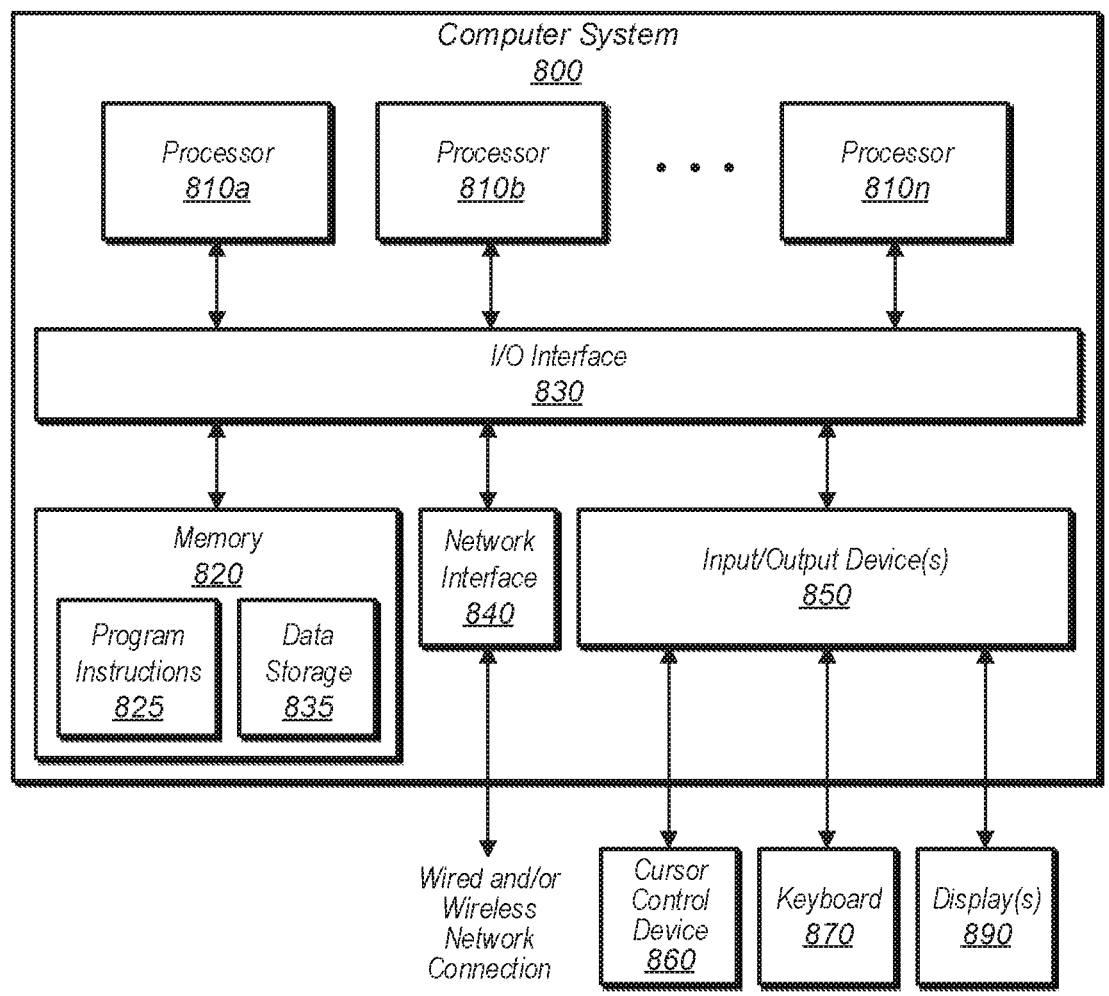
FIG. 8 is a block diagram illustrating an example computer system that implements some or all of the techniques described herein, according to some embodiments.

Any of various computer systems may be configured to implement processes associated with upgrading an execution environment for event-driven functions. For example, FIG. 8 is a block diagram illustrating one embodiment of a computer system suitable for implementing some or all of the techniques described herein. For example, one or more of the computer systems may host one or more respective execution environments (e.g., updated or old/previous environments). In some cases, a host computer system (e.g., compute host) may host multiple execution environments.

In various embodiments, the provider network may include one or more computer systems 800 such as that illustrated in FIG. 8 or one or more components of the computer system 800 that function in a same or similar way as described for the computer system 800. As discussed above, one or more of the software and/or hardware components of the computer system 800 may be considered part of an execution environment (e.g., old or updated version). For example, an updated version of an execution environment may include one or more new hardware components, removal of one or more hardware components, and/or modification of one or more of the hardware components with respect to a previous or old version of the same execution environment.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the provider network or compute service are shown stored within system memory 820 as program instructions 825. In some embodiments, system memory 820 may include data 835 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other devices attached to a network, such as between a host of the event-driven compute service 104 and other computer systems, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.7, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device 850 (e.g., cursor control device, keyboard, or display(s) may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the provider network, compute service, various other services, compute hosts, other devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
   a plurality of compute nodes of a compute service configured with respective execution environments, wherein at least some of the execution environments are an updated version of an execution environment and at least some of the execution environments are a previous version of the execution environment;
   a plurality of functions registered with the compute service to be executed in one of the execution environments when invoked; and
   one or more processors and memories, wherein the memories have stored thereon instructions, which when executed by the one or more processors, cause the one or more processors to:
      for at least some of the registered functions:
         for at least some invocations of the function, execute the function in the updated version of the execution environment;
         for other invocations of the function, execute the function in the previous version of the execution environment; and
         obtain a resulting status of the executions of the function in the updated version and the previous version of the execution environment;
      determine, based on the resulting status of the executions of the registered functions, that some of the registered functions are compatible with the updated version of the execution environment and others of the registered functions are incompatible with the updated version of the execution environment; and
      modify the compute service to perform subsequent executions of the incompatible functions in the previous version of the execution environment instead of in the updated version of the execution environment.

2. The system as recited in claim 1, wherein the instructions cause the one or more processors to:
   modify the compute service to perform subsequent executions of the compatible functions in the updated version of the execution environment instead of in the previous version of the execution environment.

3. The system as recited in claim 1, wherein the compute service is configured to:

receive, from a client of the compute service, an updated version of a particular one of the incompatible functions; and modify the compute service to enable execution of the updated version of the particular function in the updated version of the execution environment.

4. The system as recited in claim 3, wherein the compute service is configured to:

obtain an additional resulting status of one or more respective executions of the updated version of the particular function in the updated version of the execution environment; and determine, based on the additional resulting status, that the particular function is compatible with the updated version of the execution environment.

5. The system as recited in claim 1, wherein the compute service is configured to:

determine, based on the resulting status of the executions of the functions in the updated version of the execution environment, that one or more particular functions of the plurality of registered functions that have not yet executed in the updated version of the execution environment are incompatible with the updated version of the execution environment; and modify the compute service to perform subsequent executions of the one or more particular functions in the previous version of the execution environment instead of in the updated version of the execution environment.

6. A method, comprising:

implementing, by a compute service of a provider network, a plurality of compute nodes with respective execution environments, wherein at least some of the execution environments are an updated version of an execution environment and at least some of the execution environments are a previous version of the execution environment, and wherein a plurality of functions are registered with the compute service for execution in one of the execution environments when invoked;

for at least some of the registered functions:
for at least some invocations of the function, executing the function in the updated version of the execution environment;
for other invocations of the function, executing the function in the previous version of the execution environment; and
obtaining a resulting status of the executions of the function in the updated version and the previous version of the execution environment;

determining, based on the resulting status of the executions of the registered functions, that one or more of the registered functions satisfy one or more criteria for execution in the updated version of the execution environment and one or more others of the registered functions do not satisfy the one or more criteria for execution in the updated version of the execution environment; and modifying the compute service to perform subsequent executions of the one or more other registered functions in the previous version of the execution environment instead of in the updated version of the execution environment.

7. The method as recited in claim 6, further comprising:

modifying the compute service to perform subsequent executions of the one or more registered functions in the updated version of the execution environment instead of in the previous version of the execution environment.

8. The method as recited in claim 6, further comprising:

receiving, from a client of the compute service, an updated version of a particular one of the one or more other registered functions that did not satisfy the one or more criteria; and modifying the compute service to enable execution of the updated version of the particular function in the updated version of the execution environment.

9. The method as recited in claim 8, further comprising:

obtaining an additional resulting status of one or more respective executions of the updated version of the particular function in the updated version of the execution environment; and determining, based on the additional resulting status, that the particular function satisfies the one or more criteria for execution in the updated version of the execution environment.

10. The method as recited in claim 9, further comprising:

instantiating the updated version of the execution environment on an additional compute node; and executing the particular function in the updated version of the execution environment on the additional compute node.

11. The method as recited in claim 6, further comprising:

determining, based on the resulting status of the execution of the registered functions in the updated version of the execution environment, that one or more particular functions of the plurality of registered functions that have not yet executed in the updated version of the execution environment do not satisfy the one or more criteria for execution in the updated version of the execution environment; and modifying the compute service to perform subsequent executions of the one or more particular functions in the previous version of the execution environment instead of in the updated version of the execution environment.

12. The method as recited in claim 11, wherein at least one of the particular functions is provided by a different client of the compute service than clients that provided the executed functions.

13. The method as recited in claim 6, wherein the one or more criteria for execution in the updated version of the execution environment comprises:

execution without an error;
execution with less than a threshold number of errors; and
execution within a threshold period of time.

14. A non-transitory computer-readable storage medium storing program instructions that, when executed by one or more computing devices of a compute service, cause the one or more computing devices to implement:

implementing, by a compute service of a provider network, a plurality of compute nodes with respective execution environments, wherein at least some of the execution environments are an updated version of an execution environment and at least some of the execution environments are a previous version of the execution environment, and wherein a plurality of functions are registered with the compute service for execution in one of the execution environments when invoked;

for at least some of the registered functions:
for at least some invocations of the function, executing the function in the updated version of the execution environment;
for other invocations of the function, executing the function in the previous version of the execution environment; and obtaining a resulting status of the executions of the function in the updated version and the previous version of the execution environment;

determining, based on the resulting status of the executions of the registered functions, that one or more of the registered functions satisfy one or more criteria for execution in the updated version of the execution environment and one or more others of the registered functions do not satisfy the one or more criteria for execution in the updated version of the execution environment; and modifying the compute service to perform subsequent executions of the one or more other registered functions in the previous version of the execution environment instead of in the updated version of the execution environment.

15. The non-transitory computer-readable storage medium of claim 14, wherein the program instructions cause the one or more computing devices to implement:

modifying the compute service to perform subsequent executions of the one or more registered functions in the updated version of the execution environment instead of in the previous version of the execution environment.

16. The non-transitory computer-readable storage medium of claim 14, wherein the program instructions cause the one or more computing devices to implement:

receiving, from a client of the compute service, an updated version of a particular one of the one or more other registered functions that did not satisfy the one or more criteria; and modifying the compute service to enable execution of the updated version of the particular function in the updated version of the execution environment.

17. The non-transitory computer-readable storage medium of claim 16, wherein the program instructions cause the one or more computing devices to implement:

obtaining an additional resulting status of one or more respective executions of the updated version of the particular function in the updated version of the execution environment; and determining, based on the additional resulting status, that the particular function satisfies the one or more criteria for execution in the updated version of the execution environment.

18. The non-transitory computer-readable storage medium of claim 17, wherein the program instructions cause the one or more computing devices to implement:

instantiating the updated version of the execution environment on an additional compute node; and executing the particular function in the updated version of the execution environment on the additional compute node.

19. The non-transitory computer-readable storage medium of claim 14, wherein the program instructions cause the one or more computing devices to implement:

determining, based on the resulting status of the execution of the registered functions in the updated version of the execution environment, that one or more particular functions of the plurality of registered functions that have not yet executed in the updated version of the execution environment do not satisfy the one or more criteria for execution in the updated version of the execution environment; and modifying the compute service to perform subsequent executions of the one or more particular functions in the previous version of the execution environment instead of in the updated version of the execution environment.

20. The non-transitory computer-readable storage medium of claim 14, wherein the one or more criteria for execution in the updated version of the execution environment comprises:

execution without an error;

execution with less than a threshold number of errors; and execution within a threshold period of time.

* * * * *